UNITED STATES PATENT OFFICE.

FRITZ HOFMANN, KONRAD DELBRÜCK, AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING PINACONES.

1,039,739. Specification of Letters Patent. Patented Oct. 1, 1912.

No Drawing. Application filed February 28, 1911. Serial No. 611,374.

*To all whom it may concern:*

Be it known that we, FRITZ HOFMANN, KONRAD DELBRÜCK, and KURT MEISENBURG, citizens of the German Empire, residing at Elberfeld, Germany, have invented new and useful Improvements in Processes of Producing Pinacones, of which the following is a specification.

According to Hollmann (*Rec. de Trav. Chim. des Pays-Bas* 25, 206, 1906) acetone can be reduced to pinacone by allowing a solution of mercuric chlorid in acetone to drop upon metallic magnesium and treating the organo-magnesium compound thus produced with water. For this reaction it is necessary to use an excess of acetone, 3 instead of 2 molecules (see Couturier, *Comptes Rendus de l'Acad. des Sciences* 140, 721, and *Bull. de la Soc. Chim. de Paris* 33, 454, 1905) as the organo-magnesium compound takes up 1 molecule of acetone as acetone of crystallization. We have now found that benzene or toluene can be substituted for the acetone of crystallization. The use of an excess of acetone, part of which suffers disagreeable changes by the reaction, is thus rendered superfluous.

In order to illustrate the new process more fully the following example is given, the parts being by weight:—200 grams of a 10 per cent. mercuric chlorid acetone solution are added to 100 grams of magnesium metal; to this violently reacting mixture, a mixture of 300 grams of acetone with 600 grams of benzene is added and then 800 grams of benzene. When the reaction is complete, the organo-magnesium compound is decomposed by the addition of 125 grams of water, the metallic precipitate is removed by filtration and the pinacone is precipitated from the benzene solution as its hydrate by the addition of 300 grams of water.

In the foregoing process the mercuric chlorid and metallic magnesium react to form magnesium amalgam, this latter reagent being thus formed during the reaction.

We claim:—

1. Process of producing a pinacone from a ketone which comprises treating such ketone with magnesium amalgam in the presence of a non-reactive diluent, and decomposing the organic magnesium compound thus produced, substantially as described.

2. Process of producing a pinacone from a ketone which comprises treating such ketone with magnesium amalgam in the presence of an aromatic hydrocarbon as a non-reactive diluent, and decomposing the organic magnesium compound thus produced, substantially as described.

3. Process of producing a pinacone from a ketone which comprises treating such ketone with magnesium amalgam in the presence of coal tar benzene as a non-reactive diluent, and decomposing the organic magnesium compound thus produced, substantially as described.

4. Process of producing pinacone from acetone which comprises treating acetone with magnesium amalgam in the presence of a non-reactive diluent, and decomposing the organic magnesium compound thus produced, substantially as described.

5. Process of producing pinacone from acetone which comprises treating acetone with magnesium amalgam in the presence of an aromatic hydrocarbon as a non-reactive diluent, and decomposing the organic magnesium compound thus produced, substantially as described.

6. Process of producing pinacone from acetone which comprises treating acetone with magnesium amalgam in the presence of coal tar benzene as a non-reactive diluent, and decomposing the organic magnesium compound thus produced, substantially as described.

7. Process of producing a pinacone from a ketone which comprises treating such ketone with mercuric chlorid and metallic magnesium in the presence of a non-reactive diluent, and decomposing the organic magnesium compound thus produced, substantially as described.

8. Process of producing a pinacone from a ketone which comprises treating such ketone with mercuric chlorid and metallic magnesium in the presence of an aromatic hydrocarbon as a non-reactive diluent, and decomposing the organic magnesium compound thus produced, substantially as described.

9. Process of producing a pinacone from a ketone which comprises treating such ketone with mercuric chlorid and metallic magnesium in the presence of coal tar benzene as a non-reactive diluent, and decomposing the organic magnesium compound thus produced, substantially as described.

10. Process of producing pinacone from acetone which comprises treating acetone with mercuric chlorid and metallic magnesium in the presence of a non-reactive diluent, and decomposing the organic magnesium compound thus produced, substantially as described.

11. Process of producing pinacone from acetone which comprises treating acetone with mercuric chlorid and metallic magnesium in the presence of an aromatic hydrocarbon as a non-reactive diluent, and decomposing the organic magnesium compound thus produced, substantially as described.

12. Process of producing pinacone from acetone which comprises treating acetone with mercuric chlorid and metallic magnesium in the presence of coal tar benzene as a non-reactive diluent, and decomposing the organic magnesium compound thus produced, substantially as described.

13. Process of producing pinacone from acetone which consists in treating 2 molecules of acetone with mercuric chlorid and 1 molecule of magnesium in the presence of a non-reactive diluent, decomposing the organic magnesium compound thus produced and finally isolating the pinacone, substantially as described.

14. Process of producing pinacone from acetone which consists in treating 2 molecules of acetone with mercuric chlorid and 1 molecule of magnesium in the presence of an aromatic hydrocarbon as a non-reactive diluent, decomposing the organic magnesium compound thus produced and finally isolating the pinacone, substantially as described.

15. Process of producing pinacone from acetone which consists in treating 2 molecules of acetone with mercuric chlorid and 1 molecule of magnesium in the presence of coal tar benzene as a non-reactive diluent, decomposing the organic magnesium compound thus produced and finally isolating the pinacone, substantially as described.

In testimony whereof we have hereunto set our hands in the presence of two subscribing witnesses.

FRITZ HOFMANN. [L. S.]
KONRAD DELBRÜCK. [L. S.]
KURT MEISENBURG. [L. S.]

Witnesses:
CHAS. J. WRIGHT,
ALFRED HENKEL.